April 3, 1973  A. HAGER  3,725,042
METHOD FOR IMPROVING THE LIFE OF THE REFRACTORY LINING
OF THE REFINING VESSEL OF A SPRAY REFINING PLANT
Filed Feb. 17, 1971
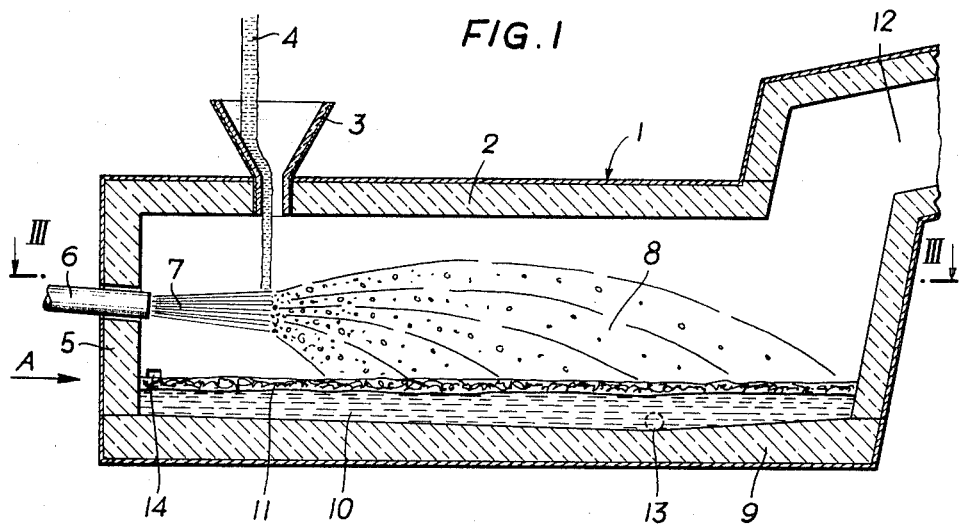
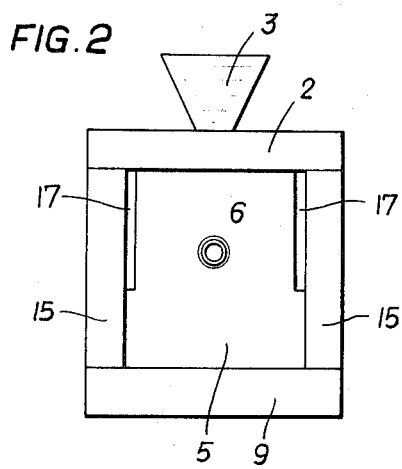
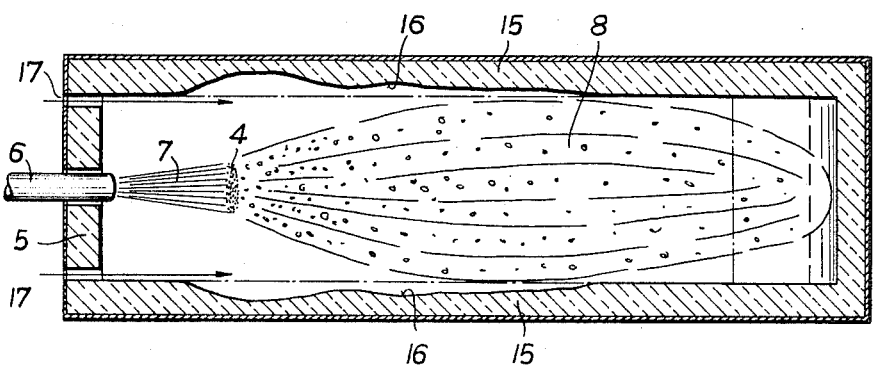
INVENTOR
ALOIS HAGER
BY Brumbaugh, Graves,
Donohue & Raymond
his ATTORNEYS

United States Patent Office 3,725,042
Patented Apr. 3, 1973

3,725,042
METHOD FOR IMPROVING THE LIFE OF THE REFRACTORY LINING OF THE REFINING VESSEL OF A SPRAY REFINING PLANT
Alois Hager, Linz, Austria, assignor to Vereinigte Oesterreichische Eisen- und Stahlwerke Aktiengesellschaft, Linz, Austria
Filed Feb. 17, 1971, Ser. No. 116,118
Claims priority, application Austria, Feb. 20, 1970, 1,555/70
Int. Cl. C21c 7/00
U.S. Cl. 75—60                                    4 Claims

ABSTRACT OF THE DISCLOSURE

The invention relates to a method for improving the life of a refractory lining of a refining vessel of a spray-refining plant in which a pig iron stream running in vertical direction into the refining vessel designed as a hearth of long extension is atomized by at least one refining gas jet which is blown in about horizontally under formation of a spraying cone, comprising introducing cooling air on both sides of the spraying cone along both side walls of the refining vessel. By this provision the spraying cone is kept away from the side walls of the refining vessel. Further advantages gained are that the refining gas consumption is reduced and that the course of the reaction progresses more calmly because the occurrence of whirls in the area of the spraying cone is prevented.

---

The invention relates to a method for improving the life of the refractory lining of the refining vessel of a spray-refining plant in which a pig iron stream running in vertical direction into the refining vessel designed as a hearth of long extension is atomized by at least one refining gas jet which is blown in about horizontally under formation of a spraying cone.

In the continuous conversion of pig iron into a blown metal or into steel according to the spray-refining process the refractory lining of the refining vessel undergoes great wear in the area where the gaseous refining agent hits upon the pig iron stream. It has not been possible so far to effectively prevent this wear to which primarily the side walls of the refining vessel are subjected. The spraying head which is used for blowing in the refining gas jet and which penetrates the front wall of the elongated refining vessel has been attempted to be formed in a manner that the spraying cone does not get into contact with the side walls of the refining vessel; spraying cones of complicated design were used but their life was not satisfactory. In order to improve the life of the side walls of the refining vessel and the spraying heads it has also been proposed to introduce the gaseous refining agent in the form of a primary and a secondary jet under pressure; by this measure the atomization of the liquid pig iron was improved and the formation of whirls, which are created in a closed refining vessel, was obviated. All these measures brought only gradual improvements of the operational conditions; a continuous refining operation over a longer period of time without the necessity of exchanging the spraying head and/or repairing the refractory lining of the refining vessel had been impossible so far.

The present invention overcomes these difficulties and disadvantages. In accordance therewith, in a method for improving the life of the refractory lining of the refining vessel of a spray refining plant it is proposed to introduce air on both sides of the spraying cone along the two side walls of the refining vessel. Thus the side walls are cooled and the spraying cone is kept away from the side walls. The use of a spraying head of complicated design is not necessary.

When the oxygen-enriched pressurized air is used as refining gas with about 30 to 35% oxygen and a pressure of 10 to 15 at. gauge, preferably about the double amount of cooling air, referred to the amount of refining gas, is continuously introduced through vertical slits in the front wall of the refining vessel.

When technically pure oxygen is used as refining gas with a pressure of 10 to 50 at. gauge, about the threefold to fourfold amout of cooling air, referred to the amount of refining gas, may continuously be introduced through vertical slits in the front wall of the refining vessel.

In order that the invention may be more fully understood an embodiment thereof shall now be explained with reference to the accompanying drawing.

FIG. 1 is a longitudinal sectional view of the refining vessel of a spray refining plant, FIG. 2 is a front view in direction "A" of FIG. 1, and FIG. 3 is a horizontal sectional view along the line III—III of FIG. 1.

Numeral 1 denotes a refining vessel designed as a hearth of long extension, in the cover 2 of which an inlet funnel 3 is provided for the supply of liquid pig iron 4. In the front wall 5 of the refining vessel a spraying head or a blowing nozzle 6, respectively, is built in for the supply of oxygen-enriched compressed air or technically pure oxygen. By means of the refining gas jet 7 the pig iron is atomized and a spraying cone 8 that is approximately horizontal is formed. In the hearth 9 the refined metal 10 and the slag 11 are collected. Numeral 12 denotes a gas off-take. An opening 13 is provided for tapping the refined metal while the slag may run off via an opening 14.

In a customary operation method, i.e. without the supply of air, the side walls 15 are greatly worn along the spraying cone 8; the wearing line which is established after about five charges (heats) is denoted with numeral 16 in FIG. 3. The front wall of the refining vessel is penetrated by slits 17; through these slits air is sucked in because, owing to the ejector effect of the refining gas jet, a reduced pressure is created in the refining vessel. The flowing direction of this air which is flowing in without external application of pressure is indicated by arrows in FIG. 3; the air cools the side walls 15 and thus prevents them from being worn. Surprisingly, the supply of air through the slits 17 does not increase the oxygen content in the waste gas which means that the additionally introduced air participates in the refining reaction. Thus the refining gas consumption is reduced. Further, it was observed that the course of the reaction progresses more calmly because the occurrence of whirls in the area of the spraying cone is prevented.

The following tables illustrate a number of comparative heats which were carried out on industrial scale, in which the pig iron throughput amounted to about 600 kg./min. and compressed air containing 34% of oxygen was used as refining gas. In one test series (Table I) no cooling air was supplied, whereas in the other test series (Table II) the side walls of the refining vessel were cooled by air. The dimensions of the slits arranged in the front wall for sucking in air from the atmosphere amounted to 600 mm. x 90 mm. In the first test series (Table I) a wear as indicated by the line 16 in FIG. 3 could be observed at the side walls after five melts; the greatest erosion had a depth of 150 mm.

In the other test series (Table II) no wear was noticeable. Furthermore a comparison of the characterizing data, in particular of charges 5 and 6, will show that owing to the supply of cooling air a considerable reduction of the oxygen consumption is achieved, while the oxygen content in the waste gas remains unchanged. The consumption of oxygen from the refining gas jet is reduced on average by about one-third owing to the supply of cooling air.

On principle, it is possible to use any desired, non-combustible cooling gases for blowing them through the slits into the refining vessel.

When the amount of pig iron supplied per time unit is changed, the amount of air may be regulated by changing the cross-sections of the slits, which may easily be achieved by employing suitable valves.

TABLE I

| Charge Number | 1 | 2 | 3 | 4 | 5 |
|---|---|---|---|---|---|
| C content of the pig iron (percent) | 4.0 | 4.1 | 4.1 | 4.0 | 4.1 |
| C content of the pre-refined pig iron (percent) | 2.5 | 2.2 | 2.3 | 1.6 | 1.7 |
| Oxidizing loss of C+Si+Mn+P (percent) | 3.7 | 3.9 | 4.1 | 4.4 | 4.5 |
| Consumption of oxygen from the refining gas jet, standard cubic meters/metric ton of pig iron | 21.8 | 22.0 | 23.0 | 30.8 | 30.2 |
| Waste gas analysis: | | | | | |
| $O_2$ (percent) | 0.3 | 0.3 | 0.4 | 0.2 | 0.6 |
| $CO_2$ (percent) | 18.4 | 16.2 | 15.3 | 21.9 | 17.7 |
| CO (percent) | 8.2 | 10.8 | 9.0 | 16.2 | 12.4 |
| $H_2$ (percent) | 0.6 | 0.7 | 0.5 | 0.4 | 0.3 |

TABLE II

| Charge Number | 6 | 7 | 8 | 9 | 10 |
|---|---|---|---|---|---|
| C content of the pig iron (percent) | 4.2 | 4.1 | 4.2 | 4.0 | 4.2 |
| C content of the steel (percent) | 0.74 | 0.62 | 0.20 | 0.02 | 0.02 |
| Oxidizing loss of C+Si+Mn+P (percent) | 4.6 | 4.8 | 5.3 | 5.1 | 5.7 |
| Consumption of oxygen from the refining gas jet, standard cubic meters/metric ton of pig iron | 21.8 | 26.4 | 26.5 | 30.4 | 32.0 |
| Waste gas analysis: | | | | | |
| $O_2$ (percent) | 0.3 | 0.3 | 0.3 | 0.3 | 0.3 |
| $CO_2$ (percent) | 16.5 | 10.5 | 14.0 | 10.5 | 11.6 |
| CO (percent) | 6.7 | 20.2 | 12.6 | 19.0 | 19.4 |
| $H_2$ (percent) | 0.2 | 0.4 | 0.2 | 0.4 | 0.1 |

What I claim is:

1. A method for refining liquid pig iron in a refining vessel designed as a refractory lined, elongated hearth having a front wall, two side walls, a hearth bottom, a cover, a rear wall and a gas off-take near the rear wall comprising the steps of running a stream of liquid pig iron vertically into the refining vessel, atomizing the stream of liquid pig iron by a refining gas emitted from a jet positioned substantially horizontal from the front wall to form a spraying cone, withdrawing the refined liquid pig iron from the bottom of the refining vessel and introducing air on both sides of the spraying cone along both side walls to protect the side walls from deterioration from the spraying cone.

2. The method set forth in claim 1, wherein when oxygen-enriched pressure air with about 30 to 35% of oxygen and a pressure of 10 to 15 at. gauge is used as refining gas, substantially the double amount of cooling air, referred to the amount of refining gas, is continuously introduced through openings arranged in a front wall of the refining vessel.

3. The method set forth in claim 1, wherein, when technically pure oxygen with a pressure of 10 to 15 at. gauge is used as refining gas, the threefold to fourfold amount of cooling air, referred to the amount of refining gas, is continuously introduced through openings arranged in a front wall of the refining vessel.

4. In a method of operating a spray-refining steelmaking vessel designed as a refractory-lined elongated hearth comprising a cover with means for introduction of liquid pig iron, a hearth bottom, a front wall with gas introduction means, two side walls, a gas off-take near a rear wall, and tap means for slag and steel, wherein at least one refining gas jet is blown in substantially horizontally through said front wall to atomize liquid pig iron supplied vertically through said cover under formation of a spraying cone, an improvement comprising the step of introducing air through the front wall laterally of the refining gas jet to protect side walls against the spraying cone.

References Cited
UNITED STATES PATENTS

| | | | |
|---|---|---|---|
| 3,272,618 | 9/1966 | Miller | 75—60 |
| 3,460,935 | 8/1969 | Lythgoe et al. | 75—60 |
| 3,511,643 | 5/1970 | Vallak et al. | 75—40 |
| 3,169,160 | 2/1965 | Johansson | 75—60 X |
| 3,201,105 | 8/1965 | Miller | 75—60 X |

L. DEWAYNE RUTLEDGE, Primary Examiner

J. E. LEGRU, Assistant Examiner

U.S. Cl. X.R.

75—52, 59